Sept. 22, 1964 R. G. ROBERTSON 3,150,271

TRANSISTOR PUMP CIRCUIT WITH TIME CONSTANT MULTIPLIER

Filed Oct. 6, 1960

INVENTOR.
Robert G. Robertson

BY T. L. Styner
Attorney

1

3,150,271

TRANSISTOR PUMP CIRCUIT WITH TIME CONSTANT MULTIPLIER

Robert G. Robertson, Clearwater, Fla., assignor to General Dynamics Corporation, Rochester, N.Y., a corporation of Delaware Filed Oct. 6, 1960, Ser. No. 60,920
6 Claims. (Cl. 307—88.5)

The present invention relates generally to a transistor pump circuit for generating a staircase or stepped waveform from an input train of pulses and is more particularly concerned with improvements in such a circuit for providing a linear decay of the staircase output from its peak value without at the same time adversely affecting the linearity of the steps during the build-up of the output voltage.

Figure 1:
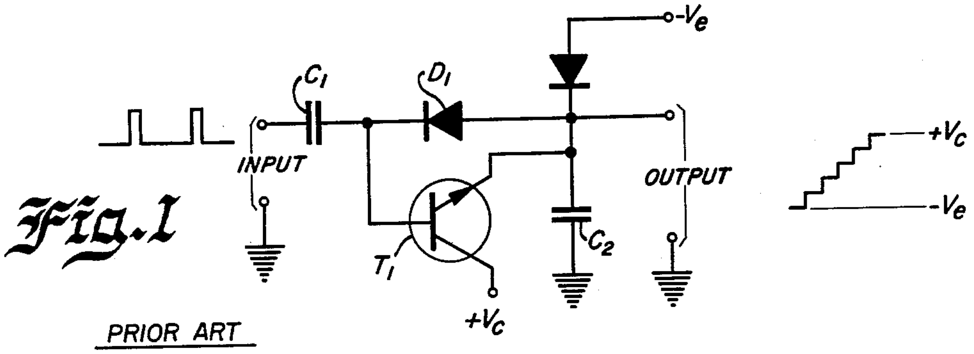
Fig.1 PRIOR ART

Transistor pump circuits of the general type with which the present invention is concerned are known in the art and one such circuit is described, for example, in an article entitled "Unusual Transistor Circuits," by P. L. Burton and J. Willis, appearing on page 108 of the March 1958 issue of the publication Wireless World. One form of this circuit is also shown in FIG. 1 of the drawing of the present application. In the circuit there shown a train of positive input pulses supplied to the input terminals charges a capacitor $C_2$ in steps to develop the staircase waveform at the output terminals. The capacitors $C_1$ and $C_2$ of the circuit are initially uncharged at the start of the pulse period so that the leading edge of the first pulse causes the transistor $T_1$ to conduct, thus connecting the condensers $C_1$ and $C_2$ in series across the input terminals. Since $C_1$ is much smaller than $C_2$, the major portion of the input pulse voltage is developed across $C_1$ while only a small portion of this voltage appears across $C_2$. The trailing edge of the first pulse drive the junction between the condenser $C_1$ and the diode $D_1$ in a negative direction thus cutting off the transistor $T_1$ and isolating the condenser $C_2$ from the input with the result that the charge on the latter condenser is maintained during the period between successive pulses. The diode $D_1$ permits the condenser $C_1$ to discharge during the period between pulses. This action continues so that during each of the periods between pulses the condenser $C_1$ is discharged and during the arrival of each succeeding pulse a further charge is added to the condenser $C_2$ which will therefore be referred to in the ensuing description as the step charged condenser. The build-up of voltage across the condenser $C_2$ continues until the maximum value is reached at a level which is equal to or slightly less than the voltage of the collector supply $V_c$.

Figure 2:
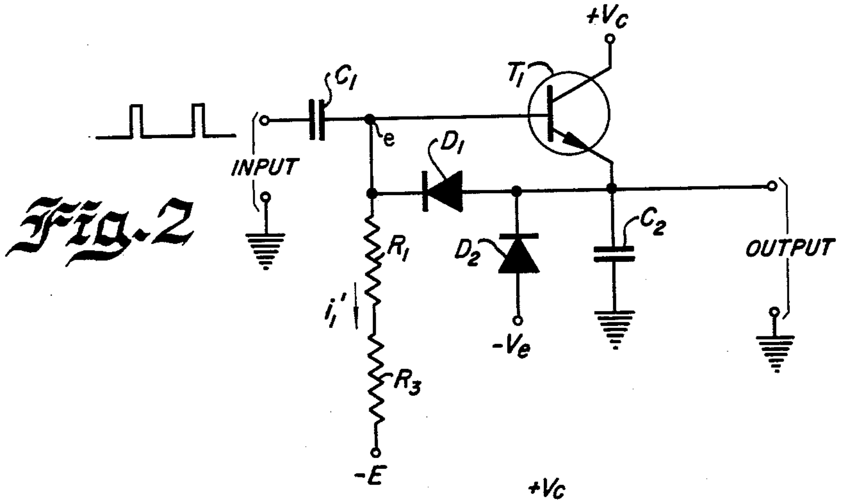

In some applications for the pump circuit illustrated, it is desirable that the output voltage decay linearly from its maximum or peak value. One possible solution to this problem is illustrated in FIG. 2 of the drawing of the present application where the condenser $C_2$ is permitted to discharge through a relatively large resistance represented by resistors $R_1$ and $R_3$ which are in turn connected to a very large negative voltage E. The discharge of the condenser $C_2$ toward this low voltage level instead of towards ground, of course, improves the linearity of the initial portion of the discharge as will be well understood by those skilled in this art. However, the proposed solution represented by the circuit shown in FIG. 2 is not entirely satisfactory since the time constant of the discharge circuit for the condenser $C_2$ must be relatively high in order to prevent this condenser from discharging during the periods between pulses, a feature which is difficult to achieve without introducing instability in the transistor characteristics. This problem is aggravated when the input pulses have a slow repetition rate, since this requires the condenser $C_2$ to maintain its charge level for relatively

2 long periods between pulses. The seriousness of the problem of providing a high time constant discharge for the condenser $C_2$ will be appreciated when it is recognized that the resistance inserted in the discharge circuit cannot be too large because a large resistance in the base circuit of the transistor makes the operating characteristics of this transistor very unstable. Any instability of the transistor, of course, produces nonlinear or uneven steps in the rise of the staircase waveform and is highly undesirable. The time constant for the discharge circuit may also be increased by using a larger condenser $C_2$, but the benefits to be realized by resorting to this solution are limited by the fact that a large condenser in the emitter circuit causes the transistor to draw excessive current so that it is overdriven and deteriorates very rapidly. For all of these reasons the circuit illustrated in FIG. 2 does not afford a completely satisfactory solution to the problem of providing a linear discharge for the staircase waveform at the output of the pump circuit, particularly when the repetition rate of the input pulses is slow.

The present invention has for a primary object the provision of a transistor pump circuit of the type described above but including means for providing a linear discharge of the output waveform without at the same time requiring the use of excessively large resistors and condensers which introduce the aforementioned problems.

A further object of the present invention is to provide a circuit of the type described above including means for providing an increased time constant for the circuit through which the step charged condenser is discharged.

Another object of the invention is to provide a transistor pump circuit of the type described above including a degenerative feedback circuit which makes the discharge circuit for the step charge condenser act as a very large resistance without actually employing a large resistor in this portion of the circuit.

Figure 3:
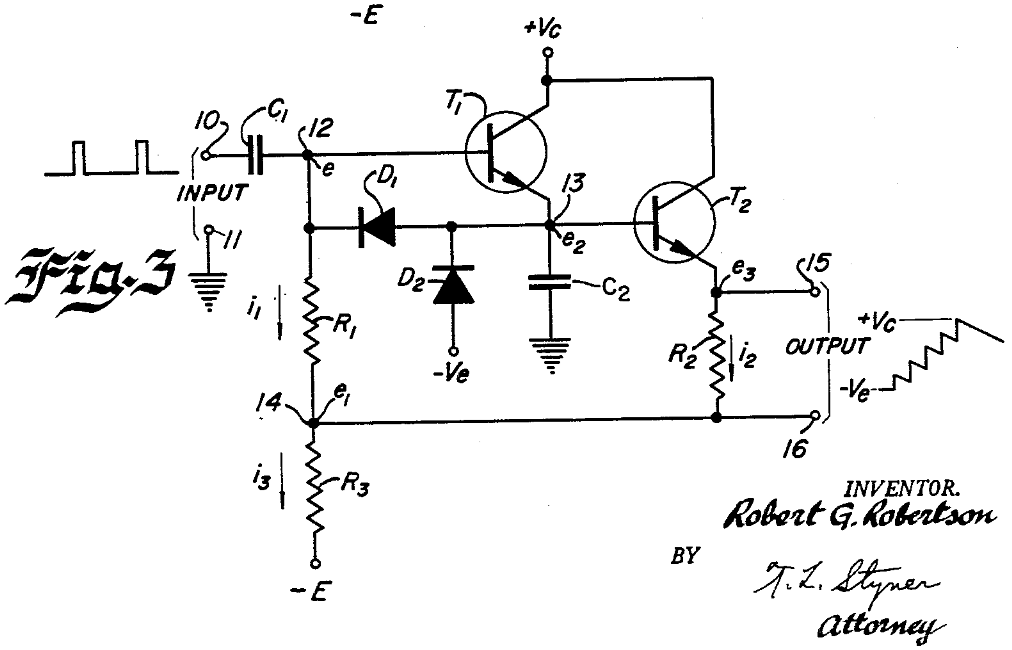

The invention, both as to its organization and manner of operation, together with further objects and advantages will best be understood by reference to the following detailed description taken in conjunction with the accompanying drawing wherein:

FIG. 1, as was previously mentioned, is a schematic diagram illustrating a transistor pump circuit which has been used prior to the present invention;

FIG. 2 is a schematic diagram illustrating a proposed circuit for providing a linear discharge of the staircase waveform output which circuit, as was described above, is not entirely satisfactory particularly when the repetition rate of the input pulses is relatively slow; and FIG. 3 is a schematic diagram illustrating the circuit of the present invention.

Referring now to FIG. 3 of the drawing, the circuit of the present invention is there illustrated as including a pair of condensers $C_1$ and $C_2$, a diode $D_1$, and a transistor $T_1$, all of which perform the functions of the corresponding elements in the circuit shown in FIG. 1 and described above. Thus, the train of input pulses applied to the input terminals 10 and 11 of the circuit shown in FIG. 3 charges the capacitor $C_2$ in steps to develop thereacross a stepped or staircase waveform which is applied to the base circuit of a second transistor $T_2$ for a purpose which will become apparent as the description proceeds. While the transistors $T_1$ and $T_2$ are shown as being of the NPN type and the diode $D_1$ is poled for operation with positive input pulses, it is obvious that the circuits may be modified for use with negative pulses by using PNP type transistors. However, the ensuing description is devoted exclusively to the circuit arrangement for positive pulses.

The manner in which the stepped waveform is developed across the step charged condenser $C_2$ will be obvious from the foregoing discussion and, hence, will not be repeated in detail. Briefly, the leading edge of the positive incoming pulse causes the transistor $T_1$ to conduct in order to increase the charge on the condenser $C_2$. The trailing edge of the input pulse drives the junction 12 in a direction to cut off the transistor $T_1$. During the periods between pulses, the condenser $C_1$ discharges through the diode $D_1$ and the junctions 12 and 13 are at approximately the same potential in order to avoid a reverse bias on the transistor $T_1$. During the periods between pulses, the condenser $C_2$, of course, tries to discharge through the diode $D_1$ and through the resistors $R_1$ and $R_3$ but the time constant of this discharge network is so high that very little discharge can take place. The condenser $C_2$ is connected through a discharge network including the diode $D_1$ and the resistors $R_1$ and $R_3$ which are connected in series between the junction 12 and a relatively high negative D.C. source E. The base of the transistor $T_1$ is connected to the high negative potential of the source E but the diode $D_1$ prevents the emitter from going more negative than the emitter source $V_e$. The potential of the emitter of the transistor $T_1$, of course, follows that of the base when the input pulses arrive so that the junction 13 rises in steps from the initial level of $-V_e$ to a maximum level of $+V_c$. This produces the stepped or staircase wave across the condenser $C_2$ assuming that the resistance of the discharge network is sufficient to prohibit significant discharge of the condenser $C_2$ during the periods between pulses.

The stepped or staircase waveform appearing across the condenser $C_2$ is also applied to the base of the transistor $T_2$ which acts as a high current gain emitter follower. To this end, the collector of the transistor $T_2$ is connected to the voltage supply $V_c$ for the collector of the transistor $T_1$ while the emitter of the transistor $T_2$ is connected through a load resistor $R_2$ to the junction 14 between the resistors $R_1$ and $R_3$. The stepped waveform applied to the base of the transistor $T_2$, of course, causes emitter current flow through the resistor $R_2$ to develop the circuit output voltage across a pair of output terminals 15 and 16 spanning the resistor $R_2$. The emitter follower $T_2$ functions during the period of the staircase wave to supply a feedback current which passes through the resistor $R_3$ to drive the junction 14 in a positive direction. This feedback current is highly degenerative since the transistor $T_2$ has a high current gain and, as a result, the voltage change at the junction 14 is appreciable. Thus, during the period of the staircase wave, the condenser $C_2$ discharges towards a much less negative voltage than during the linear discharge period which follows the cessation of the input pulses. The degenerative feedback of the emitter current from the transistor $T_2$ through the resistor $R_3$ in the discharge circuit for the condenser $C_2$ gives the effect of a very large resistance in the latter circuit without actually employing a large resistor. The resistors $R_1$, $R_2$ and $R_3$ are so proportioned; i.e., the resistor $R_2$ is much smaller than $R_1$ and $R_3$; that the current flow through the resistor $R_2$ is substantially independent of the transistor gain. This means that the stability of the transistors is unimportant since it has little effect upon the output appearing across the terminals 15 and 16. At the same time, the resistors $R_1$ and $R_3$ are small enough that the total resistance in the base circuit for the transistor $T_1$ is not so large as to make the operating characteristics of this transistor unstable. In addition, the condenser $C_2$ is small enough so that the transistor $T_1$ does not draw excessive current and, hence, is not overdriven. It will be recognized that without the degenerative feedback it would not be possible to use such a small condenser $C_2$ and a small resistance $R_1$ and $R_3$.

In order to demonstrate that the circuit shown in FIG. 3 satisfies the conditions set out above, it is only necessary to show that:

(1) The current $i_1$ is proportional to and much smaller than the current that would have passed through the resistors $R_1$ and $R_3$ if the emitter follower $T_2$ and the resistor $R_2$ had not been added; that is, the current $i_1$ is smaller than the current $i_1'$ flowing in the circuit shown in FIG. 2 when circuit parameters of the same size are used; and (2) The transistor parameters are of minor importance in determining the discharge rate of the condenser $C_2$.

If it is assumed that the current gain of the transistor $T_2$ is at least moderately large, the resistor $R_2$ can be made large enough so that the voltage $e_2$ at the junction 13 is substantially equal to the voltage $e_3$ at the terminal 15 while at the same time making the resistance $R_2$ many times smaller than either $R_1$ or $R_3$. Applying Kirchoff's law to the circuit shown in FIG. 3 it can be seen that:

$$i_3=i_1+i_2 \quad (1)$$

$$i_3=i_1+i_1\frac{R_1}{R_2} \quad (2)$$

since $e_3$ is substantially the same as $e_2$.

Simplifying:

$$i_3=i_1\left(1+\frac{R_1}{R_2}\right) \quad (3)$$

It can also be seen that $e_1=i_3R_3$. (4)

Substituting Equation 3 for $i_3$ in Equation 4 yields:

$$e_1=R_3i_1\left(1+\frac{R_1}{R_2}\right) \quad (5)$$

Moreover, it will be observed that the voltage, $e$, at point 12:

$$e=e_1+i_1R_1 \quad (6)$$

Substituting for $e_1$ from Equation 5 yields:

$$e=R_3i_1\left(1+\frac{R_1}{R_2}\right)+i_1R_1 \quad (7)$$

Simplifying Equation 7 yields:

$$e=i_1\left[R_1+R_3\left(1+\frac{R_1}{R_2}\right)\right] \quad (8)$$

The expression in the brackets of Equation 8 may be designated as Z which in turn can be simplified as:

$$Z=R_1+\frac{R_1R_3}{R_2}+R_3 \text{ or } Z=R_1\left(1+\frac{R_3}{R_2}\right)+R_3 \quad (9)$$

$$R_1\left(\frac{R_3}{R_2}\right)+R_3 \text{ or } R_3\left(\frac{R_1}{R_2}+1\right)$$

Since $R_3$ is many times greater than $R_2$, the ratio $$\frac{R_3}{R_2}$$

is many times greater than 1 and as a result Z is approximately equal to $$R_1\left(\frac{R_3}{R_2}\right)+R_3$$

or $$R_3\left(\frac{R_1}{R_2}+1\right) \quad (10)$$

But since $R_1$ is many times greater than $R_2$, the ratio $$\frac{R_1}{R_2}$$

is many times greater than 1, and as a consequence Z is approximately equal to $$\frac{R_3R_1}{R_2}$$

and as a results $e$ from Equation 8 is approximately equal to $$\frac{R_3R_1}{R_2}i_1$$

Therefore $$i_1=\frac{eR_2}{R_3R_1} \quad (11)$$

If the transistor $T_2$ and the resistor $R_2$ had not been used as in the circuit shown in FIG. 2, then $i_1'$, which is the current flowing through the resistor $R_1$ and $R_3$, is equal to $$\frac{e}{R_1+R_3} \quad (12)$$

The ratio of $i_1'$ to $i_1$ indicates the factor by which the discharge time for the condenser $C_2$ has been increased by the circuit of FIG. 3 and this ratio may be expressed as follows:

$$\frac{\frac{e}{R_1+R_3}}{\frac{eR_2}{R_3R_1}}$$

which ratio may be simplified as $$\frac{R_1R_3}{R_1+R_3}\times\frac{1}{R_2} \quad (13)$$

From the Expression 13 it can be seen that the factor of improvement is equal to the parallel resistance of $R_1$ and $R_3$ divided by $R_3$ and in practice this factor can be made very large and substantially independent of transistor parameters. Thus, it will be observed that the circuit shown in FIG. 3 is effective to increase the time constant of the discharge network for the capacitor $C_2$ without at the same time increasing either the resistance in the base circuit of the transistor or the size of the condenser $C_2$. Therefore, this circuit effectively prevents discharge of the condenser $C_2$ between the pulses of the incoming train by effectively lengthening the time constant of the discharge circuit.

While the present invention has been described in connection with the details of a particular embodiment thereof, it should be understood that these details are not intended to be limitative of the invention since many modifications will be readily apparent to those skilled in this art and it is, therefore, contemplated in the accompanying claims to cover any such modifications as fall within the true spirit and scope of the invention.

What is claimed as new and desired to be secured by Letters Patent of the United States is:

1. In a circuit for developing from a train of input pulses a waveform which changes in steps from an initial level to a peak value and then reverts substantially linearly towards said level, said circuit including an input circuit having a first condenser, a rectifier and a second condenser connected in series to ground, and a first transistor having a pair of electrodes respectively connected to opposite sides of said rectifier and a third electrode connected to a source of biasing potential, said input circuit being rendered effective by each input pulse to charge both of the condensers, the second condenser being larger than the first condenser so that only a portion of each input pulse is developed thereacross, the improvement which comprises first and second resistors connected in series between a source of reference potential and the junction of said first condenser and said rectifier to provide a first discharge path for said second condenser, and a high current gain emitter follower circuit including a second transistor having a base electrode connected to the junction between said rectifier and said second condenser, said second transistor also having a collector electrode connected to said source of biasing potential and an emitter electrode connected through a third resistor to the junction between said first and second resistors in order to pass degenerative feedback current through said second resistor to increase the time of discharge of said second condenser, through said first discharge path, thereby to prevent substantial discharge of said second condenser during the periods between pulses but to provide fore the discharge of said second condenser while the step waveform reverts from said peak value towards said initial level, said third resistor having a resistance many times smaller than that of either of said first and second resistors, and the output from the circuit being derived from the current flow from said emitter electrode through said third resistor.

2. In a circuit for developing from a train of input pulses a waveform which changes in steps from an initial level to a peak value and then reverts substantially linearly towards said level, said circuit including an input circuit having a first condenser, a rectifier and a second condenser connected in series to ground, and an electron discharge device having a pair of electrodes respectively connected to opposite sides of said rectifier, said input circuit being rendered effective by each of the input pulses to charge both of said condensers the improvement which comprises first and second resistors connected in series between a source of potential and the junction of said first condenser and said rectifier to provide a first discharge path for said second condenser, and a high current gain emitter follower circuit including a transistor having one electrode connected to the junction between said rectifier and said second condenser and having an emitter electrode connected through a third resistor to the junction between said first and second resistors in order to pass degenerative feedback current through said third resistor to increase the discharge time for said second condenser through said first path, thereby to prevent substantial discharge of said second condenser during the periods between pulses but to provide for the discharge of said second condenser while the step waveform reverts from said peak value towards said initial level, the output from the circuit being derived from the current flow from said emitter electrode through said third resistor.

3. In a circuit for developing from a train of input pulses a waveform which changes in steps from an initial level to a peak value and then reverts substantially linearly towards said level, said circuit including an input circuit having a first condenser, a rectifier and a second condenser connected in series to ground, and a transistor having a pair of electrodes respectively connected to opposite sides of said rectifier and a third electrode connected to a source of biasing potential, said input circuit being rendered effective by each of the input pulses to charge both of said condensers, the improvement which comprises first and second resistors connected in series between a source of reference potential and the junction of said first condenser and said rectifier to provide a first discharge path for said second condenser, and a feedback circuit including an electron discharge device having one electrode connected to the junction between said rectifier and said second condenser and having another electrode connected through a third resistor to the junction between said first and second resistors in order to pass degenerative feedback current through said third resistor to increase the discharge time for said second condenser, thereby to prevent substantial discharge of said second condenser during the periods between pulses but to provide for the discharge of said second condenser while said waveform reverts from said peak value towards said initial level, said third resistor having a resistance many times smaller than that of either of said first and second resistors, and the output from the circuit being derived from the current flow from said another electrode of said device through said third resistor.

4. In a circuit for developing from a train of input pulses a waveform which changes in steps from an initial level to a peak value and then reverts substantially linearly towards said level, said circuit including an input circuit having a first condenser, a rectifier and a second condenser connected in series to a point of reference potential, a transistor having a pair of electrodes respectively connected to opposite sides of said rectifier, and means for applying operating potential to the remaining electrode of said transistor, said input circuit being rendered effective by each of the input pulses to charge both of said condensers, the second condenser being larger than the first condenser so that only a portion of each input pulse is developed thereacross, the improvement which comprises a source of potential; a discharge resistance, a discharge path between said source of potential and said second condenser and including said discharge resistance for discharging said second condenser therethrough, and a degenerative feedback circuit including a current amplifying device between said second condenser and said discharge resistance for passing a current related to the voltage appearing across said second condenser and connected to pass through at least a portion of said discharge resistance a current for effectively increasing the time for discharge of said second condenser through said discharge path.

5. In a circuit for developing from a train of input pulses a waveform which changes in steps from an initial level to a peak value and then reverts substantially linearly towards said level, said circuit including an input circuit having a first condenser, a rectifier and a second condenser connected in series to a point of reference potential, and an electron discharge device having a pair of electrodes respectively connected to opposite sides of said rectifier, means for applying operating potentials to third electrode of said device said input circuit being rendered effective by each of the input pulses to change both of said condensers, the improvement which comprises a source of potential, a discharge resistance, a discharge path between said source of potential and said second condenser and including said discharge resistance for discharging said second condenser therethrough, and a degenerative feedback including a current amplifying device between said second condenser and said discharge resistance for passing a current related to the voltage appearing across said second condenser and connected to pass through at least a portion of said discharge resistance a current for effectively increasing the time for discharge of said second condenser through said discharge path.

6. In a circuit for developing from a train of input pulses a waveform which changes in steps from an initial level to a peak value and then reverts substantially linearly towards said level, said circuit including an input circuit having a first condenser, a rectifier and a second condenser connected in series to a point of reference potential, and a switching device having a pair of electrodes respectively connected to opposite sides of said rectifier, means for applying operating potentials to a third electrode of said device, said input circuit being rendered effective by each of the input pulses to charge both of said condensers, the improvement which comprises a source of potential, a resistance, a discharge path between said source of potential and the junction of said first condenser and said rectifier, and including said resistance for discharging said second condenser therethrough, a transistor having a feedback circuit between said second condenser and said resistance, said feedback circuit including a transistor having a base electrode connected to the junction between said rectifier and said second condenser, a collector electrode connected to said source of potential and an emitter electrode connected to pass degenerative feedback current through at least a portion of said resistance in order to increase the time of discharge of said second condenser, thereby to prevent substantial discharge of said sceond condenser during the period between pulses but to provide for the discharge of said second condenser while the step waveform reverts from said peak value towards said initial level.

References Cited in the file of this patent

UNITED STATES PATENTS 2,873,388 Trumbo ______________ Feb. 10, 1959